(12) United States Patent
Hamada et al.

(10) Patent No.: US 10,556,281 B2
(45) Date of Patent: Feb. 11, 2020

(54) PROCESSING PROGRAM-GENERATING METHOD, PATH-GENERATING DEVICE AND ELECTRICAL DISCHARGE MACHINE

(71) Applicant: MAKINO MILLING MACHINE CO., LTD., Tokyo (JP)

(72) Inventors: Kyoichi Hamada, Aiko-gun (JP); Kunio Fujita, Aiko-gun (JP); Takayuki Shiomizu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 239 days.

(21) Appl. No.: 15/123,543

(22) PCT Filed: Mar. 6, 2014

(86) PCT No.: PCT/JP2014/055812
§ 371 (c)(1),
(2) Date: Sep. 2, 2016

(87) PCT Pub. No.: WO2015/132936
PCT Pub. Date: Sep. 11, 2015

(65) Prior Publication Data
US 2017/0072490 A1    Mar. 16, 2017

(51) Int. Cl.
*B23H 7/20* (2006.01)
*B23H 7/26* (2006.01)
(Continued)

(52) U.S. Cl.
CPC ............ *B23H 7/20* (2013.01); *B23H 7/26* (2013.01); *G05B 19/4093* (2013.01); *B23H 1/02* (2013.01);
(Continued)

(58) Field of Classification Search
CPC ..... B23H 7/20; B23H 7/26; B23H 1/02; G05B 19/4093; G05B 2219/45221; Y02P 90/265
See application file for complete search history.

(56) References Cited

U.S. PATENT DOCUMENTS 5,165,085 A    11/1992    Watanabe
5,354,961 A    10/1994    Diot et al.
(Continued)

FOREIGN PATENT DOCUMENTS

EP    1 629 921    3/2006
EP    2 486 996    8/2012
(Continued)

OTHER PUBLICATIONS

International Search Report dated May 20, 2014, directed to International Application No. PCT/JP2014/055812, 2 page.

*Primary Examiner* — Christopher S Kim
(74) *Attorney, Agent, or Firm* — Morrison & Foerster LLP

(57) ABSTRACT

To keep an electrode guide from interfering with an object such as a workpiece during the workpiece processing period, in the present invention, a path-generating device of an electrical discharge machine that is provided with an electrode guide for supporting a rod-shaped electrode is configured so as to be equipped with: a shape data-reading unit for reading the initial shape of the workpiece prior to processing and a target shape of the workpiece; an electrode-path-generating section or generating an electrode path for moving the electrode laterally on the basis of the target shape of the workpiece; and a guide path-generating section for generating an electrode guide path, which avoids interference between the electrode guide and the workpiece, on the basis of the initial shape of the workpiece.

5 Claims, 8 Drawing Sheets

(51) Int. Cl.
*G05B 19/4093* (2006.01)
*B23H 1/02* (2006.01)

(52) U.S. Cl.
CPC ... *G05B 2219/45221* (2013.01); *Y02P 90/265* (2015.11)

(56) References Cited

U.S. PATENT DOCUMENTS

| | | | |
|---|---|---|---|
| 5,911,888 A * | 6/1999 | Girardin | B23H 1/00 219/69.11 |
| 6,326,579 B1 | 12/2001 | Krawczyk et al. | |
| 6,717,094 B2 | 4/2004 | Beaumont | |
| 7,301,116 B2 | 11/2007 | Chen et al. | |
| 8,519,296 B2 | 8/2013 | Tricarico et al. | |

FOREIGN PATENT DOCUMENTS

| | | |
|---|---|---|
| JP | 5-345228 | 12/1993 |
| JP | 2006-346752 | 12/2006 |
| JP | 2007-7759 | 1/2007 |
| JP | 2008-18499 | 1/2008 |
| WO | WO-2005/018858 | 3/2005 |

* cited by examiner

PROCESSING PROGRAM-GENERATING METHOD, PATH-GENERATING DEVICE AND ELECTRICAL DISCHARGE MACHINE

CROSS-REFERENCE TO RELATED APPLICATIONS

This application is a U.S. National Stage patent application of International Patent Application No. PCT/JP2014/055812, filed Mar. 6, 2014, which is hereby incorporated by reference in the present disclosure in its entirety.

FIELD OF THE INVENTION

The present invention relates to a method for generating a machining program, a path generation apparatus, and an electrical discharge machine.

BACKGROUND OF THE INVENTION

In conventional techniques, an electrical discharge machining in which an electrical discharge is made to occur between a workpiece as an object to be machined and an electrode to machine the workpiece is known. In the electrical discharge machining, a part of the workpiece is melted and removed, thereby being capable of being machined into a desired shape. As the electrical discharge machining, a wire electrical discharge machining in which an electrical discharge is made to occur at an electrical discharge region of a center portion of an electrode linearly extending in a long manner and the linear electrode is moved relative to a workpiece, thereby cutting the workpiece is known. Further, an electrical discharge machining in which, using a rod-shaped electrode, an electrical discharge is made to occur at a tip end of the rod-shaped electrode while the rod-shaped electrode is inserted in the interior of a workpiece, thereby forming a hole in the workpiece is known.

Such an electrical discharge machining is suitable for machining, for example, a workpiece made of a hard material. When the workpiece made of a hard material is subjected to a cutting machining, machining is difficult and a very large number of tools are necessary. On the other hand, in the electrical discharge machining, to melt a part of the workpiece, even the workpiece made of a hard material can be easily machined. In addition, in the electrical discharge machining in which the hole is formed in the workpiece using the rod-shaped electrode, the hole having a very small diameter which is difficult to be formed by the cutting machining can be formed.

Japanese Laid-open Patent Publication No. H5-345228 discloses a machining method in which, from an initial position at which a tool electrode is in contact with a workpiece, the electrode is laterally moved. In this publication, longitudinal wear of a rotation electrode is simulated prior to machining and wear is calculated from a predetermined parameter. Then, advancing the tool electrode while machining the workpiece without lateral wear are disclosed.

CITATION LIST

PLT 1: Japanese Laid-open Patent Publication No. H5-345228

SUMMARY OF THE INVENTION

As disclosed in Japanese Laid-open Patent Publication No. H5-345228 as described above, the electrical discharge machining in which machining is performed by moving the electrode laterally relative to the workpiece from the state in which the tip end of the rod-shaped electrode is inserted in the workpiece is considered. Such an electrical discharge machining is called as generating machining, and not only the hole but, for example, a groove portion can be formed in a surface to be machined.

In an electrical discharge machine which electrically discharges at the tip end of the rod-shaped electrode, the rod-shaped electrode is supported by an electrode guide. The electrode guide is disposed adjacent to the tip end of the rod-shaped electrode which machines the workpiece, and has a function of preventing a deflection of the electrode. For example, a state in which the electrode protrudes by a certain length from the electrode guide is maintained.

However, when the generating machining is performed, the electrode guide is disposed at a position close to the surface to be machined of the workpiece so that the electrode guide may interfere with the workpiece. For example, when the surface to be machined of the workpiece has a curved surface shape, the electrode guide may interfere with the surface to be machined of the workpiece. Or, depending on an initial shape of the workpiece, the electrode guide may interfere with the workpiece during a machining period. If the electrode guide interferes with the workpiece, a problem in which machining is interrupted and the electrode guide is broken arises.

In the invention disclosed in the Patent Publication as described above, a control of the electrode guide when the workpiece is machined is not considered, and the electrode guide may interfere with a target object, such as the workpiece, when the workpiece is machined.

A method for generating a machining program of the present invention is a method for generating a machining program of an electrical discharge machine which comprises an electrode guide supporting an electrode having a rod shape and electrically discharges at an end portion of the electrode protruding from the electrode guide, the method including a reading step for reading an initial shape of a workpiece before machining and a target shape of the workpiece, an electrode path generation step for generating a path of the electrode in which the electrode moves relatively to the workpiece based on the target shape of the workpiece, a guide path generation step for generating a path of the electrode guide in which an interference of the electrode guide with the workpiece is avoided based on the initial shape of the workpiece, and a step of generating the machining program in accordance with the path of the electrode and the path of the electrode guide.

In the invention as described above, the guide path generation step can include a step of generating the path of the electrode guide along a surface of the workpiece having the initial shape.

In the invention as described above, the guide path generation step can include a step of generating a first auxiliary path of the electrode guide so that the electrode guide separates by a predetermined clearance from a surface of the workpiece having the initial shape based on the path of the electrode, a judgement step for judging whether or not the electrode guide interferes with a target object around the first auxiliary path when the electrode guide moves in the first auxiliary path, and a step of generating a second auxiliary path of the electrode guide in which the electrode guide is separated from the target object until an interference with the target object is avoided when it is judged that the electrode guide interferes with the target object in the judgement step, and the machining program can be generated while setting the second auxiliary path as the path of the electrode guide.

In the invention as described above, the electrode path generation step can include a correction step for correcting a wear amount of the electrode which wears in accompany with an electrical discharge machining, and the correction step can include a step of generating a path in which the electrode is moved relatively to the workpiece in a direction in which a tip end of the electrode advances toward the workpiece.

In the invention as described above, the electrode path generation step can include a step of generating a path in which the electrode moves relatively to the workpiece while a state in which the electrode extends substantially vertical to a surface of the workpiece having the target shape is maintained.

The invention as described above can include a step of displaying the path of the electrode which is generated in the electrode path generation step and the path of the electrode guide which is generated in the guide path generation step in a display part and confirming the paths.

A path generation apparatus of the present invention is a path generation apparatus for generating a path of an electrode and a path of an electrode guide of an electrical discharge machine which comprises the electrode guide supporting the electrode having a rod shape and electrically discharges at an end portion of the electrode protruding from the electrode guide, the apparatus comprising a shape data reading part which reads an initial shape of a workpiece before machining and a target shape of the workpiece, an electrode path generation part which generates the path of the electrode in which the electrode moves relatively to the workpiece based on the target shape of the workpiece, and a guide path generation part which generates the path of the electrode guide in which an interference of the electrode guide with the workpiece is avoided based on the initial shape of the workpiece.

An electrical discharge machine of the present invention comprises an electrode having a rod shape and electrically discharging between the electrode and a workpiece, an electrode guide which supports the electrode, a movement device which relatively moves the electrode and the electrode guide relative to the workpiece, and a control device which controls the movement device. The electrical discharge machine is formed so as to perform an electrical discharge machining at an end portion of the electrode protruding from the electrode guide, and the control device moves the electrode relatively while a state in which the electrode is inserted in the workpiece is maintained, and further, performs a machining control of machining the workpiece while an cutting amount of the electrode with respect to the workpiece is changed. The machining control includes a control in which the electrode is moved relatively to the workpiece in a path along a surface of the target shape of the workpiece, and the electrode guide is moved relatively to the workpiece in a path independent of a path of the electrode in which an interference of the electrode guide with the workpiece is avoided.

According to the present invention, a method for generating a machining program, a path generation apparatus, and an electrical discharge machine in which an interference of the electrode guide with the target object, such as the workpiece, during a period of machining the workpiece can be avoided, and further, the electrode guide is made to be as close as possible to the workpiece, whereby a highly accurate generating machining can be performed at a high machining speed can be provided.

DESCRIPTION OF EMBODIMENTS

A method for generating a machining program, a path generation apparatus, and an electrical discharge machine according to an embodiment will be described with reference to FIG. 1 to FIG. 11.

Figure 1:
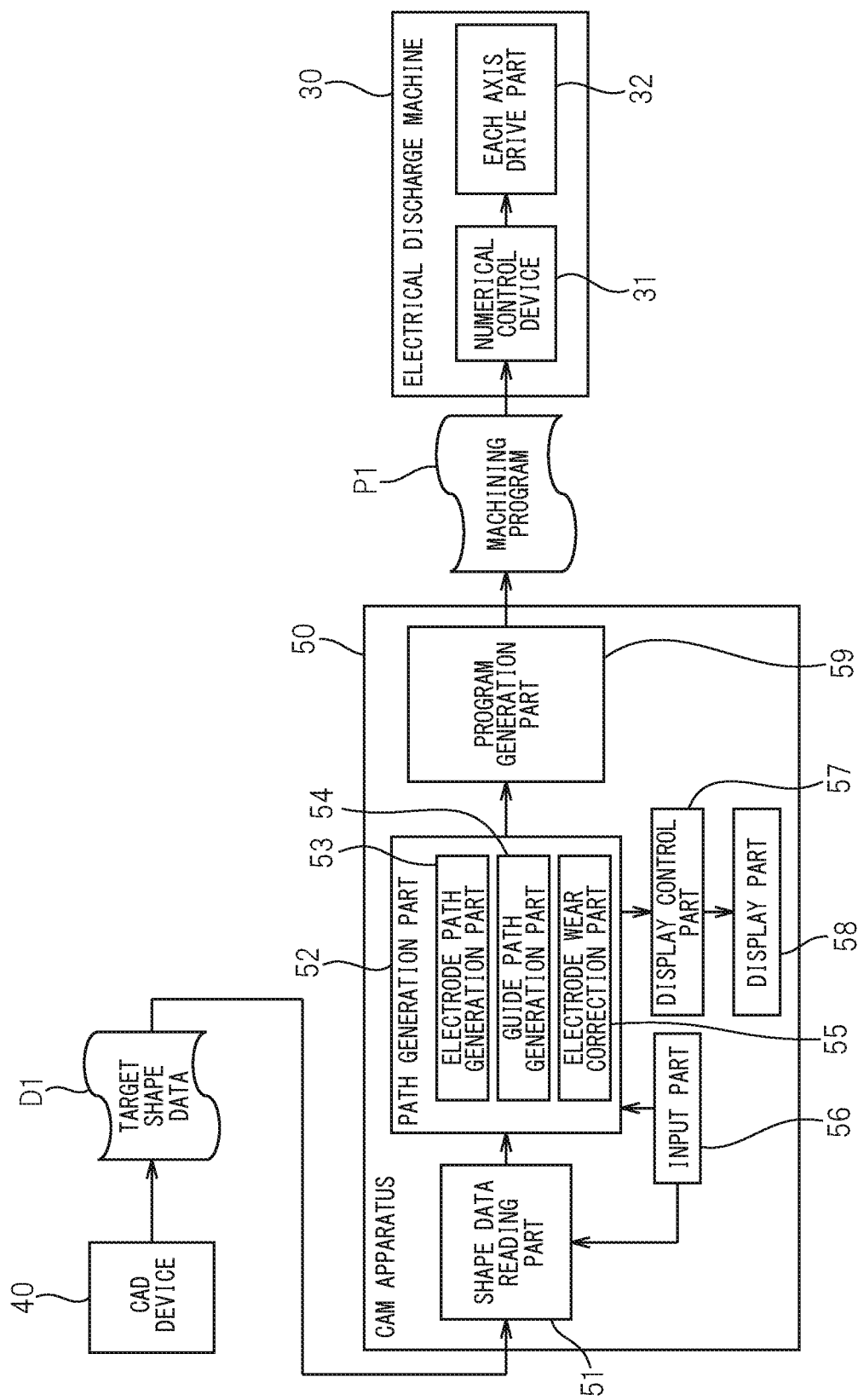
FIG. 1 is a block diagram of a machining system according to an embodiment.

FIG. 1 is a block diagram of a machining system according to the present embodiment. The machining system according to the present embodiment comprises a CAD (computer aided design) device 40, a CAM (computer aided manufacturing) apparatus 50, and an electrical discharge machine 30. In this machining system, the CAM apparatus 50 corresponds to the path generation apparatus. A target shape of a workpiece can be generated by the CAD device 40. Target shape data D1 of the workpiece which is generated by the CAD device 40 is inputted into the CAM apparatus 50.

The CAM apparatus 50 generates a machining program P1 of the electrical discharge machine 30 based on an initial shape of the workpiece before machining and the target shape of the workpiece. The CAM apparatus 50 generates the machining program P1 which corresponds to a path of an electrode and a path of an electrode guide when the workpiece is machined by the electrical discharge machine 30. The path of the electrode according to the present embodiment is a relative path of the electrode relative to the workpiece. Further, the path of the electrode guide is a relative path of the electrode guide relative to the workpiece.

The CAM apparatus 50 includes a shape data reading part 51 and a path generation part 52. The shape data reading part 51 reads the target shape data D1 generated by the CAD device 40. In addition, the initial shape data of the workpiece before machining is read. The initial shape data of the workpiece before machining can be inputted by an input part 56. Alternatively, the initial shape data of the workpiece may be included in the target shape data D1.

The path generation part 52 generates the path of the electrode and the path of the electrode guide which differs from the path of the electrode. The path of the electrode guide can include a path failing to extend parallel to the path of the electrode. The path of the electrode can be generated as a trajectory in which an electrode center point of a tip end of the electrode passes. For example, a center of a circular shape of the tip end of the electrode having a cylindrical shape can be set as the electrode center point. In addition, the path of the electrode guide can be generated as a trajectory in which a guide center point of a tip end of the electrode guide passes.

The path generation part 52 generates the path of the electrode and the path of the electrode guide based on the target shape data D1, the initial shape data of the workpiece, shape data of the electrode, and the like. A program generation part 59 generates the machining program P1 which corresponds to the paths generated by the path generation part 52.

The machining program P1 generated by the CAM apparatus 50 is inputted into the electrical discharge machine 30. The electrical discharge machine 30 includes a numerical control device 31 and an each axis drive part 32. The numerical control device 31 functions as a control device of the electrical discharge machine 30. The each axis drive part 32 functions as a movement device which relatively moves the electrode and the electrode guide relative to the workpiece. The numerical control device 31 reads and interprets the machining program P1. The numerical control device 31 performs a servo control of an electrical discharge machining, while transmitting a movement instruction to the each axis drive part 32 based on the machining program P1. Then, the each axis drive part 32 drives in accordance with the servo control, whereby the electrode and the electrode guide move relatively to the workpiece.

Figure 2:
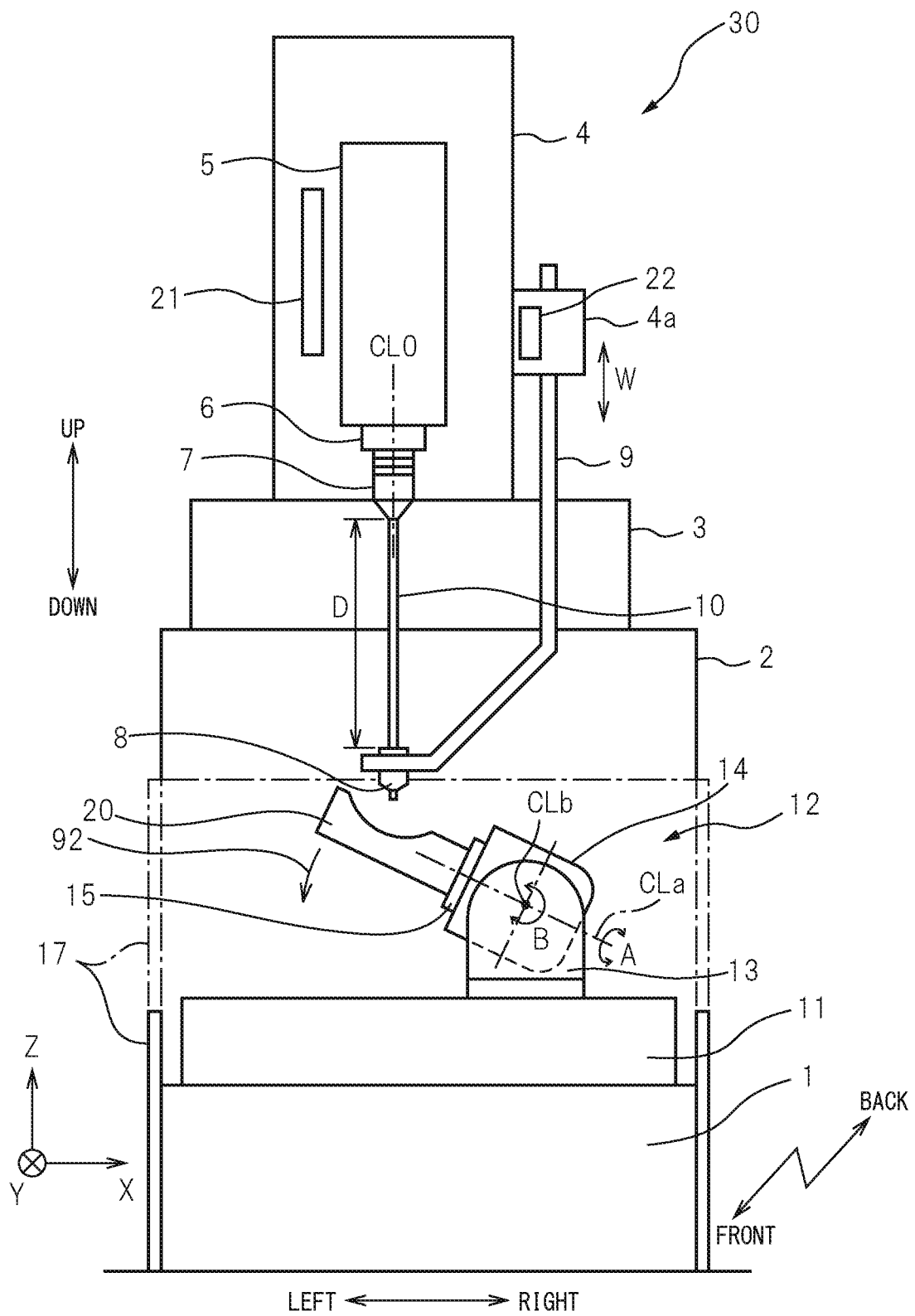
FIG. 2 is a schematic front view of an electrical discharge machine according to the embodiment.

FIG. 2 is a schematic front view of the electrical discharge machine according to the present embodiment. In the electrical discharge machine 30 according to the present embodiment, an X-axis, a Y-axis, and a Z-axis which are orthogonal to each other are determined as machine coordinates. In the below description, the X-axis direction may be referred to as a left-right direction, the Y-axis direction as a front-back direction, and the Z-axis direction as an up-down direction.

At a back portion of a bed 1 which serves as a pedestal base, a column 2 is disposed to stand. On an upper surface of the column 2, an X slider 3 is supported in a manner movable in an X-axis direction. On an upper surface of the X slider 3, a ram 4 is supported in a manner movable in a Y-axis direction. On a front surface of the ram 4, a spindle head 5 is supported in a manner movable in a Z-axis direction.

A tip end portion of a rotation spindle 6 protrudes from a bottom surface of the spindle head 5. To a lower portion of the rotation spindle 6, an electrode holder 7 is mounted. Below the electrode holder 7, an electrode guide 8 is disposed. Between the electrode holder 7 and the electrode guide 8, an electrode 10 is disposed along axis line CL0 in the up-down direction which passes through the centers of the electrode holder 7 and the electrode guide 8. The electrode guide 8 is grasped by a lower end portion of a grasping arm 9. The grasping arm 9 is supported in a manner movable in the up-down direction by a bracket 4a provided on a side surface of the ram 4. A movement axis of the grasping arm 9 in the up-down direction will be referred to as a W-axis. The W-axis according to the present embodiment is parallel to the Z-axis.

The electrode 10 is formed into a rod-shape. The electrode 10 according to the present embodiment is a pipe electrode having a cylindrical shape. An upper end of the electrode 10 is held by the electrode holder 7. An end portion of a lower side of the electrode 10 is supported by the electrode guide 8. The electrode 10 penetrates the electrode guide 8 in the up-down direction. The electrode guide 8 is formed so that the electrode 10 slides in the interior of the electrode guide 8 in the up-down direction. In the electrode 10, a deflection in the front-back direction and the left-right direction is restrained by the electrode guide 8. An end portion of the electrode 10 which protrudes from the electrode guide 8 serves as a machining portion at which an electrical discharge is generated. In other words, at the end portion of the electrode 10 at one hand which faces the workpiece 20, an electrical discharge machining is performed.

A machining liquid such as water is supplied into the interior of the electrode 10 and the machining liquid is sprayed from a lower end of the electrode 10. Note that an oil can be used as the machining liquid. In accordance with types of the workpiece, the machining, and the like, a type of the machining liquid and material of the electrode 10 are changed. Note that, as the electrode 10, which is not limited to the cylindrical pipe electrode, a solid electrode can be also used.

On an upper surface of the bed 1, a table 11 is disposed frontward of the column 2. On an upper surface of the table 11, an inclination rotation table device 12 is mounted. The inclination rotation table device 12 includes a pair of support members 13 disposed on the upper surface of the table 11. Between the pair of support members 13, an inclination member 14 supported in a manner turnable in a B-axis direction about a turn axis CLb extending in the Y-axis direction is disposed. On an end surface of the inclination member 14, a rotation table 15 supported in a manner rotatable in an A-axis direction about a rotation axis CLa vertical to the turn axis CLb is disposed.

A workpiece 20 is fixed to the rotation table 15. Around the table 11, a machining bath 17 is provided in such a manner as to surround the entirety of the table 11 and the inclination rotating table device 12. The machining bath 17 is formed in a manner movable in the up-down direction. During machining of the workpiece, the machining bath 17 ascends as illustrated by a one-dot chain line. On the other hand, the machining bath 17 descends during non-machining such as a setup operation as illustrated by a solid line.

The each axis drive part 32 of the electrical discharge machine 30 includes an X-axis drive part which moves the X slider 3 in the left-right direction relative to the column 2, a Y-axis drive part which moves the ram 4 in the front-back direction relative to the X slider 3, and a Z-axis drive part which moves the spindle head 5 in the up-down direction relative to the ram 4. The each axis drive part 32 includes a spindle drive part which rotates the rotation spindle 6 about the axis line CL0, a B-axis drive part which rotates the inclination member 14 around the turn axis CLb, and an A-axis drive part which rotates the rotation table 15 around the rotation axis CLa. Further, the each axis drive part 32 includes an arm drive part which moves the grasping arm 9 in the up-down direction.

The electrode 10 is formed in such a manner as to be capable of moving relatively to the workpiece 20 in the X-axis direction, Y-axis direction, and the Z-axis direction. Moreover, the electrode 10 is formed in such a manner as to be capable of moving relatively to the workpiece 20 in the B-axis direction and the A-axis direction. In addition, the grasping arm 9 is moved by the arm drive part, which allows a clearance between the electrode guide 8 and a surface of the workpiece 20 to be adjusted. Further, during an electrical discharge machining period, the rotation spindle 6 is rotated, which allows the electrode 10 to be rotated. In addition, the spindle head 5 comes close to the workpiece 20 by the Z-axis drive part in accompany with wear of the electrode 10, and a tip end of the electrode 10 can be disposed at a desired path.

On the front surface of the ram 4, a position detector 21 such as a linear scale, which detects an Z-axis position of the spindle head 5 in the up-down direction is provided. By a signal from the position detector 21, a position of a lower end portion of the electrode holder 7, i.e. a position of an upper end portion of the electrode 10 can be detected. A position detector 22 which detects a position of the grasping arm 9 relative to the ram 4 in a W-axis direction is provided to the bracket 4a of the grasping arm 9. By a signal from the position detector 22, a position of the electrode guide 8 relative to the ram 4 can be detected. By the signals outputted from the position detectors 21, 22, a distance D between the lower end portion of the electrode holder 7 and an upper end portion of the electrode holder 8 can be calculated. If the distance D is below a judgement value during a machining period, an approaching movement is stopped, whereby a contact of the electrode holder 7 with the electrode guide 8 is prevented.

The machining bath 17 moves in the up-down direction, whereby a height of a liquid surface of the machining liquid stored in the machining bath 17 changes. If the electrode holder 7 approaches the electrode guide 8 and is soaked in the machining liquid, the rotation spindle 6 may break down. In addition, if the electrode holder 7 is soaked in the machining liquid, the machining liquid is dispersed around and an operation environment may deteriorate. In the present embodiment, in the machining bath 17, a position in the up-down direction is controlled in such a manner as to change the height of the liquid surface of the machining liquid in accordance with a height of the electrode guide 8.

As the workpiece 20, any materials capable of performing the electrical discharge machining can be selected. In particular, in the electrical discharge machining according to the present embodiment, a workpiece having a high heat resistance and difficult to be machined by cutting is suitable. For example, a workpiece made of a nickel alloy having a high heat resistance can be used.

Next, a first electrical discharge machining method according to the present embodiment will be described. In the present embodiment, a generating machining which performs machining by moving the electrode laterally relative to the workpiece from a state in which an end portion of the electrode is inserted in the workpiece is performed.

Figure 3:
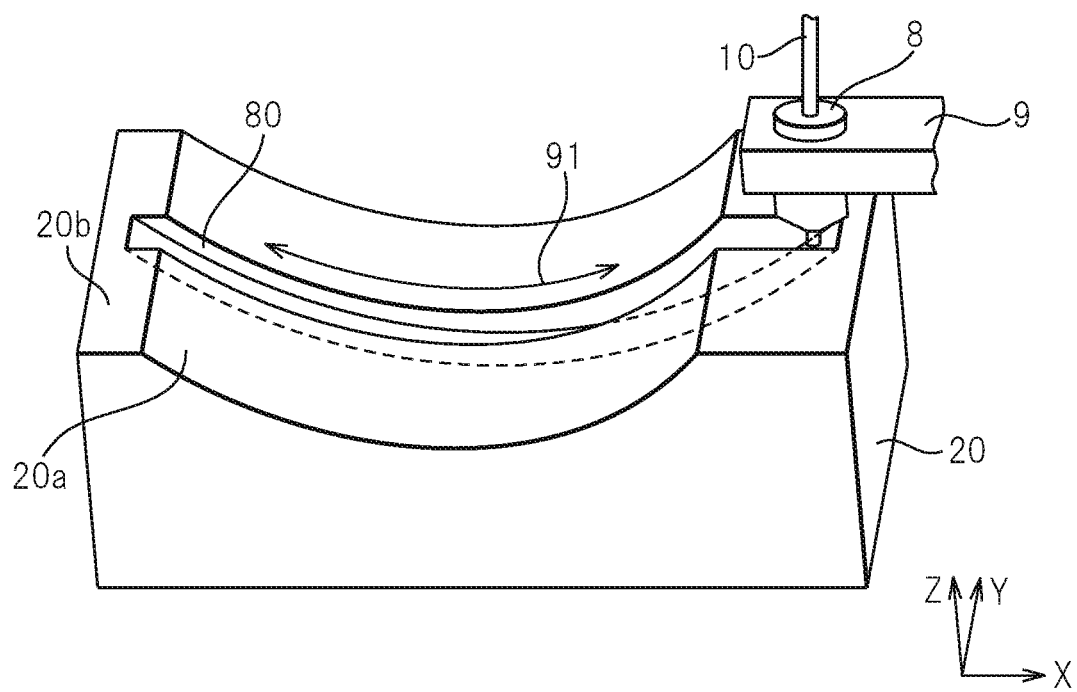
FIG. 3 is a schematic perspective view of a workpiece when the workpiece is machined into a target shape.

FIG. 3 is a schematic perspective view of the workpiece after the workpiece is machined into a target shape. In the workpiece 20 before machining is performed, a surface to be machined 20a is formed on a rectangular parallelepiped member. The surface to be machined 20a is a curved surface and has a curvature shape. In an electrical discharge machining example herein, a groove portion 80 is formed on the surface to be machined 20a. As indicated by an arrow 91, the groove portion 80 extends along a longitudinal direction of the workpiece 20. Further, the groove portion 80 is formed in such a manner that a depth of an end portion of the groove portion 80 at one hand is greater than a depth of an end portion on the other hand. Accordingly, the electrical discharge machining is performed while a depth of machining by the electrical discharge machine 30 is gradually changed. In other words, the electrical discharge machining is performed while cutting amount of the electrode 10 relative to the workpiece 20 is changed.

With reference to FIG. 1 and FIG. 3, in the first electrical discharge machining method, an inclination of the workpiece 20 is adjusted so that a bottom surface and a top surface 20b of the workpiece 20 are parallel to the X-axis and the Y-axis. In other words, rotation angles in the A-axis direction and the B-axis direction are adjusted. Subsequently, at an end portion of a region at one hand in which the groove portion 80 is to be formed, the end portion of the electrode 10 is inserted into the workpiece 20 while performing the electrical discharge. While a state in which the end portion of the electrode 10 is inserted in the workpiece 20 is maintained, the electrode 10 is moved relatively to the workpiece 20. In the first electrical discharge machining, the electrode 10 is moved relatively to the workpiece 20 in the X-axis direction and the Z-axis direction to form a thin groove portion. As indicated by the arrow 91, the electrical discharge machining is performed along a longitudinal direction of the surface to be machined 20a.

In the present embodiment, the single electrical discharge machining allows a linear groove portion to be formed. Subsequently, the electrode is moved in the Y-axis direction by a predetermined movement amount. As the predetermined movement amount, for example, a movement amount corresponding to a diameter of the electrode 10 can be set. Then, a similar electrical discharge machining is performed, whereby a width of the groove portion can be enlarged. Thus, the electrical discharge machining for forming the linear groove is plurally repeated by every interval set in advance, whereby the groove portion 80 having a large width can be formed.

Figure 4:
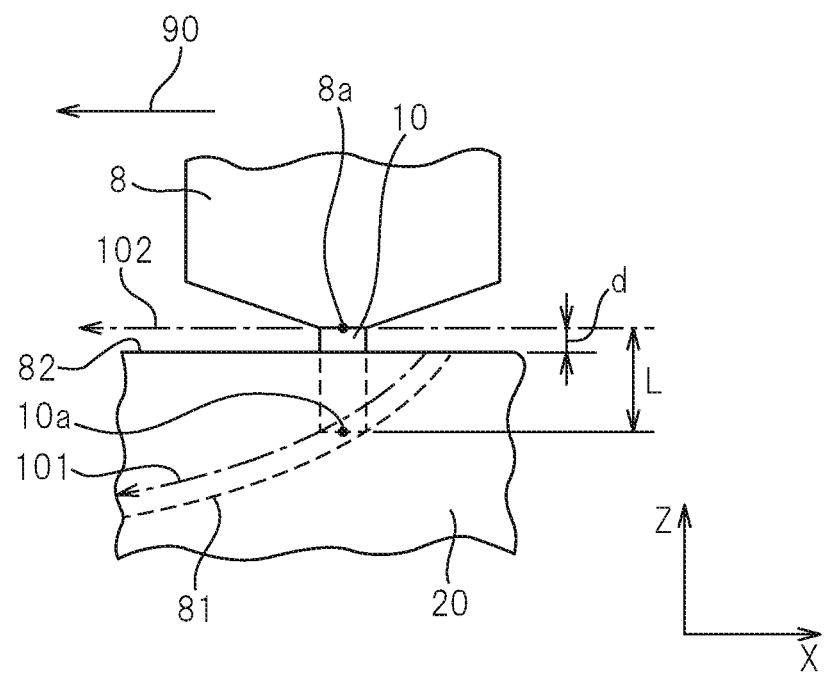
FIG. 4 is an enlarged schematic side view of a tip end portion of an electrode guide, the electrode, and the workpiece.

FIG. 4 shows a schematic side view of a tip end portion of the electrode guide, the electrode, and the workpiece. Relative to a surface 82 of the workpiece 20 having the initial shape, a surface 81 having the target shape is illustrated. The surface 81 corresponds to a bottom surface of the groove portion 80 to be formed. From the electrode guide 8, the electrode 10 protrudes by a protrusion length L. The electrode guide 8 is disposed apart from the surface 82 of the workpiece 20 by a clearance d. The cutting amount of the electrode 10 into the workpiece 20 is indicated by a length (L−d). In the electrical discharge machining according to the present embodiment, the electrode 10 is moved relatively to the workpiece 20 in a direction other than an extending direction of the electrode 10. In an example as illustrated in FIG. 4, as indicated by an arrow 90, machining is performed while the electrode 10 and the electrode guide 8 are laterally moved relative to the workpiece 20.

Figure 5:
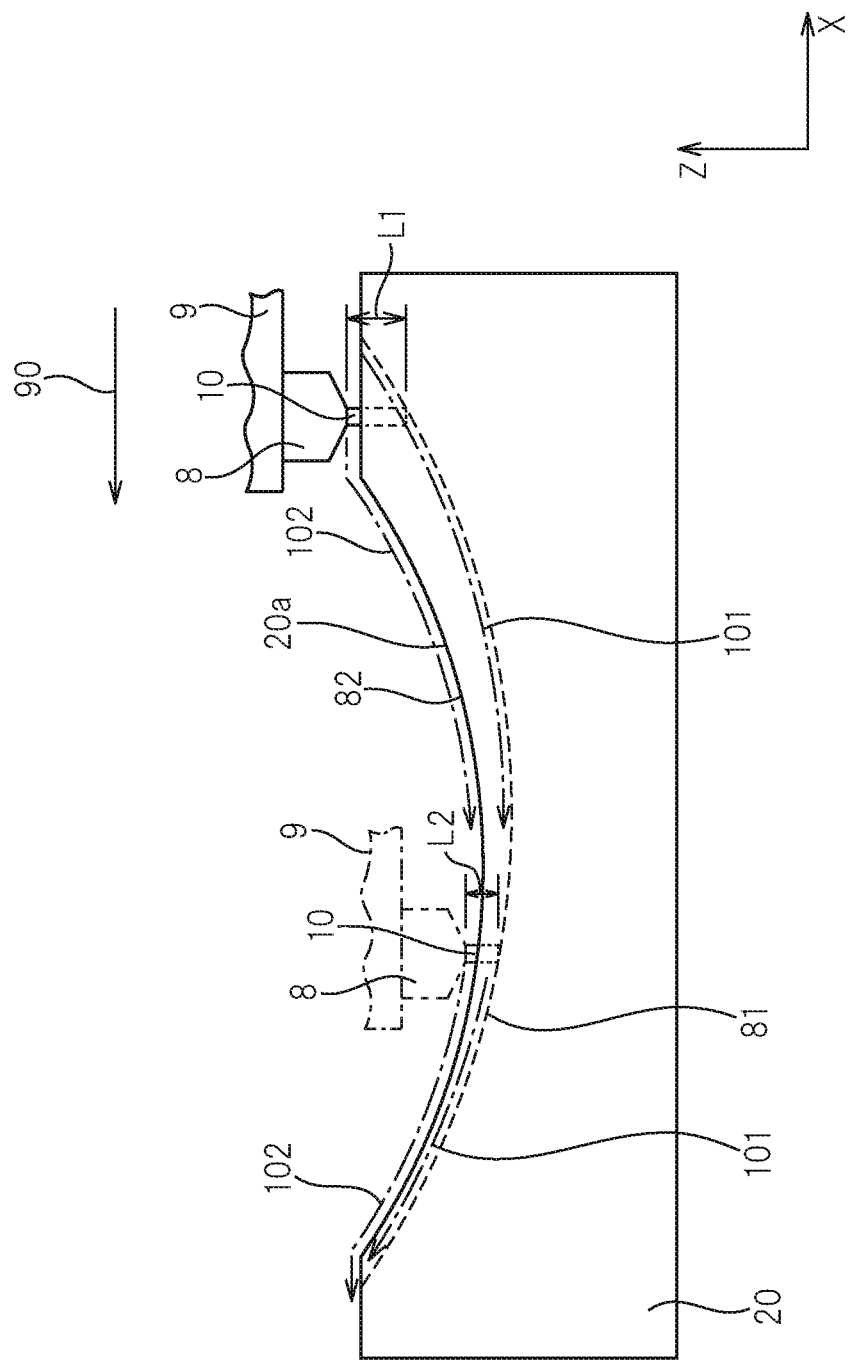
FIG. 5 is a schematic side view of the workpiece, the electrode guide, and the electrode which illustrates a first electrical discharge machining method according to the embodiment.

FIG. 5 shows a schematic side view of the workpiece, the electrode guide, and the electrode during a period of machining of the workpiece. With reference to FIG. 4 and FIG. 5, a depth of the groove portion 80 changes along an extending direction of the groove portion 80. In the first electrical discharge machining method, the clearance d between the electrode guide 8 and the surface to be machined 20a of the workpiece 20 is maintained to be constant. Accordingly, the cutting amount of the electrode 10 relative to the workpiece 20 changes along a machining direction in which the groove portion 80 extends. Consequently, protrusion lengths L1, L2 of the electrode 10 change in accordance with a depth of the surface 81 of the target shape.

In the electrical discharge machine 30 according to the present embodiment, a machining control in which the workpiece 20 is machined is performed while the cutting amount of the electrode 10 in the workpiece 20 is changed. In the machining control, the electrode 10 is moved relative to the workpiece 20 in a path along the surface 81 of the workpiece 20 having the target shape. Further, the electrode guide 8 is moved relative to the workpiece 20 in a path in which an interference of the electrode guide 8 with the workpiece 20 is avoided.

The path of the electrode is a path in which an electrode center point 10a of the electrode 10 passes. The path of the electrode is indicated by an arrow 101. The path of the electrode guide is a path in which a guide center point 8a passes. The path of the electrode guide is indicated by an arrow 102. The path of the electrode extends parallel along the surface 81 having the target shape. Further, as indicated by the arrow 102, the path of the electrode guide extends along the surface 82 in the initial shape before machining of the workpiece 20.

The numerical control device 31 of the electrical discharge machine 30 makes the electrode 10 to move based on the path of the electrode. The electrode center point 10a moves along the path of the electrode as indicated by the arrow 101. In addition, the numerical control device 31 of the electrical discharge machine 30 makes the electrode guide 8 to move based on the path of the electrode guide. The guide center point 8a moves along the path of the electrode guide as indicated by the arrow 102. The electrode 10 moves relatively to the workpiece 20 in the X-axis direction and the Z-axis direction. The electrode guide 8 moves relatively to the workpiece 20 in the X-axis direction and the W-axis direction.

In the machining control according to the present embodiment, the electrode 10 is moved relatively to the workpiece 20 in the path along the surface 81 of the workpiece 20 having the target shape. Further, in the machining control, the electrode guide 8 is moved relatively to the workpiece 20 in the path in which an interference of the electrode guide 8 with the workpiece 20 is avoided. The relative movement of the electrode guide 8 is performed in the path of the electrode guide which is not parallel to the path of the electrode and extends in a direction different from the path of the electrode. In other words, an operation of the W-axis of the electrode guide 8 is performed independently of an operation of the Z-axis of the electrode 10. Consequently, even if the workpiece is machined while the cutting amount of the electrode 10 relative to the workpiece 20 is changed, an interference of the electrode guide 8 with the workpiece 20 can be avoided.

Next, a method for generating the machining program for performing such a machining control will be described. In the method for generating the machining program according to the present embodiment, the path of the electrode guide which is different from the path of the electrode are generated, and the machining program of the electrical discharge machine 30 which performs machining in the path of the electrode and the path of the electrode guide is generated.

With reference to FIG. 1, such a machining program can be generated by the CAM apparatus 50. The path generation part 52 of the CAM apparatus 50 includes an electrode path generation part 53 which generates the path of the electrode and a guide path generation part 54 which generates the path of the electrode guide.

When the workpiece is machined by the electrical discharge machining, a part of the tip end of the electrode 10 which electrically discharges between the electrode and a workpiece gradually wears. Accordingly, a correction control which transfers the electrode 10 relative to the workpiece 20 in the Z-axis direction is performed so that the electrode center point 10a of the tip end of the electrode 10 advances on the desired path of the electrode. The path generation part 52 includes an electrode wear correction part 55 which corrects for the wear amount of the electrode 10.

The CAM apparatus 50 includes an input part 56 which can perform desired input into the path generation part 52 and the shape data reading part 51. The CAM apparatus 50 has a function of displaying a three-dimensional model image in a display part 58 so that the paths generated by the path generation part 52 can be visually confirmed by a user. A display control part 57 makes the display part 58 to display the three-dimensional model image based on the path generated by the path generation part 52.

Figure 6:
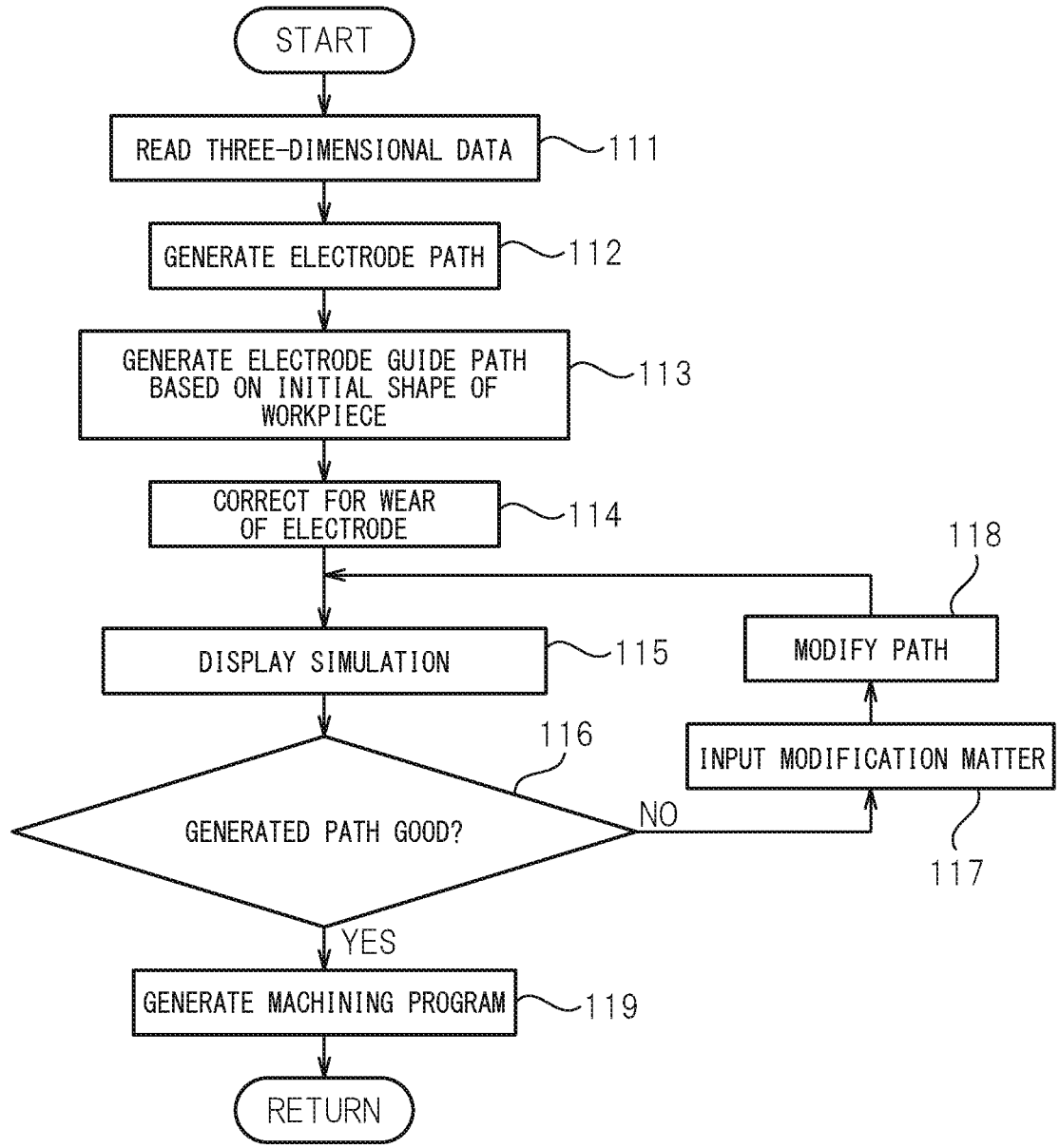
FIG. 6 is a flowchart of a method for generating a machining program according to the embodiment.

FIG. 6 shows a flowchart of the method for generating the machining program. With reference to FIG. 1 and FIG. 6, first, a reading step for reading the initial shape of the workpiece before machining and the target shape of the workpiece is performed. In step 111, three-dimensional data is read. The shape data reading part 51 reads the target shape data D1 generated by the CAD device 40. In addition, the initial shape of the workpiece can be, for example, inputted from the input part 56 into the shape data reading part 51. Alternatively, data of the initial shape of the workpiece may be included in the target shape data D1.

Next, in step 112, an electrode path generation step for generating the path of the electrode is performed. The electrode path generation part 53 of the path generation part 52 generates the path of the electrode based on the target shape of the workpiece 20. With reference to FIG. 4 and FIG. 5, in the first electrical discharge machining, the path of the electrode along the surface 81 in the target shape as indicated by the arrow 101 is generated. The path of the electrode herein has a section extending in a direction inclined relative to or orthogonal to the Z-axis direction in which the electrode 10 extends. In the present embodiment, in a direction other than the extending direction of the electrode 10, the path of the electrode in which the electrode moves relatively to the workpiece is generated.

With reference to FIG. 1 and FIG. 6, subsequently, in step 113, a guide path generation step for generating the path of the electrode guide is performed. The guide path generation part 54 of the path generation part 52 generates the path in which an interference of the electrode guide 8 with the workpiece 20 based on the initial shape of the workpiece 20. With reference to FIG. 4 and FIG. 5, in the first electrical discharge machining, the path of the electrode guide parallel to the surface 82 before machining of the workpiece 20 is generated. In particular, the path of the electrode guide is generated at a position separate by the distance d from the surface 82 of the workpiece 20 having the initial shape. The distance d is set in advance.

Such a path of the electrode and a path of the electrode guide can be generated by modeling three-dimensional data of the electrical discharge machine, the electrode, the electrode guide, the workpiece, and the like, and analyzing a movement of each part modeled. For example, each model can be generated based on the target shape data D1 outputted from the CAD device 40, the data of the initial shape of the workpiece, the three-dimensional data of the electrical discharge machine, and the like.

Next, in step 114, a correction step for correcting for a wear amount of the electrode which wears following the electrical discharge machining. In the correction step, a correction in which the electrode center point 10a when it is assumed that there is no wear of the electrode 10 is made to advance toward the workpiece 20 is performed. With reference to FIG. 2, the spindle head 5 is moved excessively in a negative direction of the Z-axis in comparison with a position set by the path of the electrode. As a feed amount which compensates wear of the electrode 10, a certain value can be set in advance based on a material of the workpiece 20, the cutting amount, a type of the electrode 10, and the like. The correction is performed, whereby the wear amount of the electrode 10 is compensated, and the electrode center point 10a of the electrode 10 can be disposed on the path of the electrode. Note that the correction with respect to wear of the electrode may not be performed in this step, but may be performed in a step of generating the machining program by the program generation part 59 in step 119.

Based on the path of the electrode and the path of the electrode guide as thus generated, and a correction amount of the wear of the electrode, movements of movement axes, such as linear axes which are the X-axis, the Y-axis, and the Z-axis and rotation axes which are the A-axis and the B-axis, are determined. Further, a movement of the W-axis which moves the grasping arm 9 is determined.

Next, in step 115, based on the path of the electrode and the path of the electrode guide which are generated, and the correction amount of the wear, a result of a three-dimensional simulation of the electrical discharge machine is displayed. With reference to FIG. 1, the display control part 57 generates an image of the three-dimensional simulation based on the path of the electrode, the path of the electrode guide, and the correction amount of the wear. The image of the simulation can be generated by modeling three-dimensional data of the electrical discharge machine, the electrode, and the electrode guide. Then, the display part 58 displays the image of the result of the simulation.

Figure 7:
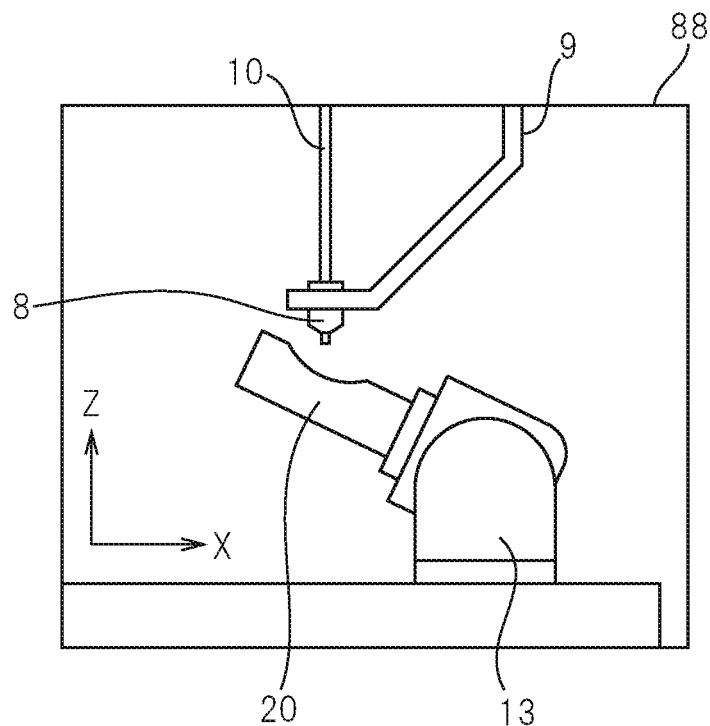
FIG. 7 is an image example displayed in a display part of a CAM apparatus according to the embodiment.

FIG. 7 shows an example of the image of the result of the simulation, which is displayed in the display part. In an image 88 of the simulation, for example, a main part of a portion at which machining is performed is displayed. In addition, in accordance with a situation of progress of machining, a position of each component such as the electrode can be confirmed in a magnified state.

With reference to FIG. 6, next, in step 116, the user confirms the image 88 of the simulation to confirm whether there is no failure in the path of the electrode and the path of the electrode path. For example, it is judged whether or not the electrode guide 8 interferes with a target object such as the workpiece 20. In step 116, when there is a failure in the path of the electrode or the path of the electrode guide which is generated, the routine proceeds to step 117.

In step 117, a modification matter of the path of the electrode or the path of the electrode guide is inputted. The modification matter of the path can be inputted into the input part 56 (see FIG. 1). Then, in step 118, a modification of the path is performed based on the modification matter. Subsequently, the routine returns to step 115. Thus, until the modification to the path of the electrode and the path of the electrode guide which are generated is unnecessary, a repetition from step 115 to step 118 is made. In step 116, when there is no failure in the path of the electrode and the path of the electrode guide which are generated, the routine proceeds to step 119.

In step 119, a program generation step for generating the machining program is performed. With reference to FIG. 1, generation of the machining program P1 is performed by the program generation part 59. The program generation part 59 generates the machining program P1 based on the path of the electrode, the path of the electrode guide, and the correction amount of the wear.

The machining program P1 generated in the present embodiment includes, in addition to information of a relative position of the electrode 10 relative to the workpiece 20, information of a relative position of the electrode guide 8 relative to the workpiece 20. In particular, in the machining program P1, information of a movement in the W-axis direction which changes the position of the electrode guide 8 is set. Alternatively, the machining program P1 includes an instruction of the arm drive part which moves the grasping arm 9 in the W-axis direction.

Thus, in the method for generating the machining program according to the present embodiment, the path of the electrode guide which is different from the path of the electrode is set. Consequently, the machining program which can avoid an interference of the electrode guide 8 with a target object, such as the workpiece, during the period of machining the workpiece 20 can be generated. In addition, the path generation apparatus can generate a path which allows the electrode guide 8 to avoid interfering with a target object such as the workpiece.

In the method for generating the machining program, the guide path generation step includes a step of generating the path of the electrode guide along the surface of the workpiece 20 having the initial shape. By adopting the method, the path of the electrode guide can be easily generated. Note that a method for generating the path of the electrode guide is not limited to this embodiment and may be any methods as long as a path in which an interference of the electrode guide 8 with a target object such as the workpiece 20 is avoided is generated.

Further, the electrode path generation step includes a correction step for correcting for a wear amount of the electrode 10 which wears in accompany with the electrical discharge machining. By the method, wear of the tip end of the electrode 10 is compensated and machining into a desired target shape can be made. In addition, the path generation apparatus can generate a path which compensates the wear of the tip end of the electrode 10.

Next, a second electrical discharge machining method according to the present embodiment will be explained. With reference to FIG. 5, in the first electrical discharge machining method, machining is performed while the inclination of the workpiece 20 relative to the extending direction of the electrode 10 is maintained to be constant. On the other hand, in the second electrical discharge machining method, machining is performed while the inclination of the workpiece relative to the extending direction of the electrode 10 is changed. In the second electrical discharge machining method, the electrical discharge machining is performed while a state in which the electrode 10 extends in a direction substantially vertical to the surface of the target shape of the workpiece 20.

With reference to FIG. 3, the bottom surface of the groove portion 80 has a curved shape. In the second electrical discharge machining method, a state in which the bottom surface of the groove 80 which is generated and the extending direction of the electrode 10 are substantially vertical is maintained. With reference to FIG. 1, in the second electrical discharge machining method, machining is performed while the groove portion 80 is formed and the inclination member 14 is rotated in the B-axis direction.

Figure 8:
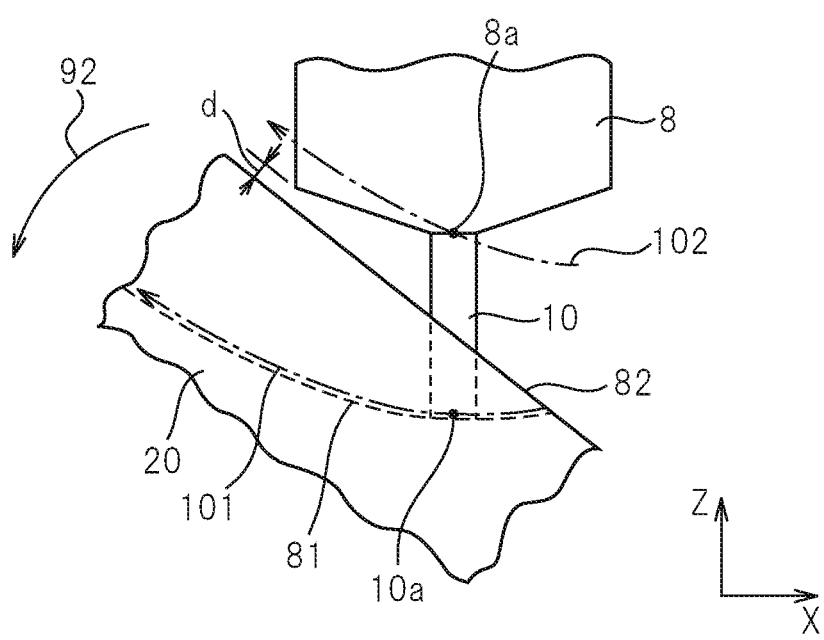
FIG. 8 is an enlarged schematic side view of the tip end portion of the electrode guide, the electrode, and the workpiece which illustrates a second electrical discharge machining method according to the embodiment.

FIG. 8 is an enlarged schematic side view of the tip end portion of the electrode guide, the electrode, and the workpiece which illustrates the second electrical discharge machining method. The surface 81 the target shape of the workpiece 20 is inclined with respect to the surface 82 of the initial shape. However, the inclination of the workpiece 20 is adjusted by the inclination member 14, whereby the electrode 10 can be disposed so that the extending direction of the electrode 10 is substantially vertical to the surface 81 of the target shape. With reference to FIG. 2 and FIG. 8, when the machining is performed, for example, the electrode 10 is moved in the X-axis direction and the Z-axis direction while the inclination of the workpiece 20 is changed to the B-axis direction as indicated by an arrow 92, whereby machining can be made.

The path of the electrode can be set to a path substantially parallel to the surface 81 of the target shape as indicated by an arrow 101. The path of the electrode guide is set to a path in which the electrode guide 8 is separated by the clearance d from the surface 82 of the initial shape.

With reference to FIG. 4, in the first electrical discharge machining method, the clearance d is a distance between the tip end of the electrode guide 8 and the surface 82 of the workpiece 20. On the other hand, in the second electrical discharge machining method, the workpiece 20 is inclined, whereby a part the closest to the surface 82 of the workpiece 20 changes. In an example as illustrated in FIG. 8, a lateral end portion of the electrode guide 8 is the closest to the surface 82 of the workpiece 20. Thus, the part of the electrode guide 8 which is the closest to the surface 82 of the workpiece 20 can be also specified by analyzing the three-dimensional model.

Then, the path of the electrode guide in which the electrode guide 8 is separated from the workpiece 20 in the W-axis direction can be generated so that the clearance between the electrode guide 8 and the workpiece 20 is d at the closest part. As indicated by the arrow 102, the path of the electrode guide extends without being parallel to the path of the electrode while a distance from the surface 82 changes.

In the second electrical discharge machining method, since machining is performed while a state in which the electrode extends substantially vertical to the surface 81 of the workpiece 20 having the target shape is maintained, wear of the electrode 10 is even and a machining accuracy is improved. A machining program for performing the second electrical discharge machining method can be generated by a process similar to the machining program of the first electrical discharge machining method (see FIG. 6). In the method for generating the machining program of the second electrical discharge machining method, the machining program which improves an accuracy of machining the workpiece can be generated.

In the second electrical discharge machining method, machining is performed while the rotation angle in the B-axis direction is changed. The embodiment is not limited to this, and the method can also apply to machining in which the rotation angle in the A-axis direction is changed in accordance with the target shape of the workpiece.

Next, a third electrical discharge machining method according to the present embodiment will be explained. In the third electrical discharge machining method, the step of generating the path of the electrode guide differs from the first electrical discharge machining method and the second electrical discharge machining method.

Figure 9:
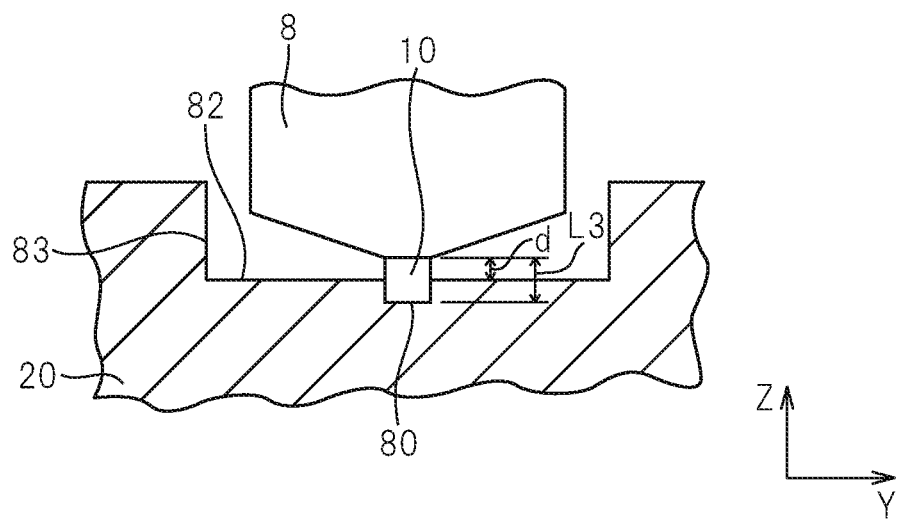
FIG. 9 is an enlarged schematic cross-sectional view of the tip end portion of the electrode guide, the electrode, and the workpiece which illustrates a third electrical discharge machining method according to the embodiment.

FIG. 9 shows a schematic cross-sectional view of an initial state of the third electrical discharge machining method according to the present embodiment. In the third electrical discharge machining method, a groove portion 83 is formed in advance in the workpiece 20. In other words, the groove portion 83 is formed in the initial shape of the workpiece 20. In the third electrical discharge machining method, the groove portion 80 is formed in the interior of the groove portion 83. In this regards, a width of an end portion of the groove portion 83 at one hand which is formed in advance is greater than a width of the electrode guide 8. Consequently, in an initial stage of the electrical discharge machining, machining can be performed while the electrode guide 8 is disposed in the interior of the groove portion 83.

The clearance d between the electrode guide 8 and the surface 82 of the initial shape of the workpiece 20 is preferably small. By configuring the clearance d to be short, a deflection of the electrode 10 is suppressed so that a machining speed and a machining accuracy can be improved. In the initial stage of the electrical discharge machining, the clearance d is controlled to be a predetermined value. For example, the clearance d is controlled to be minimum in order to suppress a deflection of the electrode 10. Accordingly, a protrusion length L3 of the electrode 10 is also controlled to be a minimum value.

Figure 10:
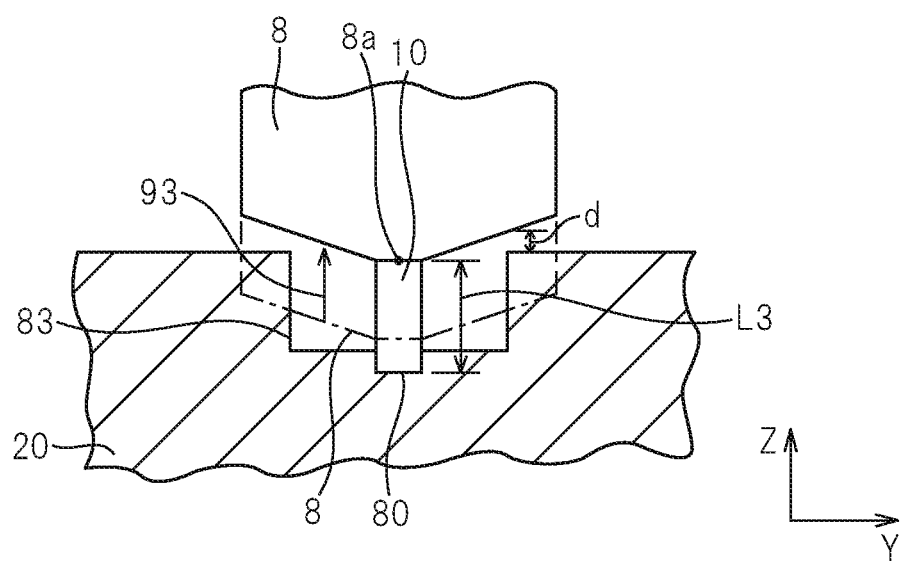
FIG. 10 is another enlarged schematic cross-sectional view of the tip end portion of the electrode guide, the electrode, and the workpiece which illustrates the third electrical discharge machining method according to the embodiment.

FIG. 10 shows a schematic cross-sectional view of a terminal state of the third electrical discharge machining method according to the present embodiment. The groove portion 83 has a shape in which a width gradually reduces along an extending direction of the groove 83. Then, at a terminal stage of the electrical discharge machining, the width of the groove portion 83 is smaller than the width of the electrode guide 8.

In FIG. 10, the electrode guide 8 disposed so that the clearance d is minimum is indicated by a one-dot chain line. When the path of the electrode guide is generated so that the clearance d is minimum, the electrode guide 8 interferes with a wall surface of the groove portion 83. Accordingly, in the third electrical discharge machining method, as indicated by an arrow 93, machining is performed while the electrode guide 8 is separated from the workpiece 20 until an interference with the workpiece 20 can be avoided. In this example, the electrode guide 8 is drawn out in the extending direction of the electrode 10, i.e. in the W-axis direction. The path of the electrode guide 8 is set so that the minimum distance between the workpiece 20 and the electrode guide 8 in the Z-axis direction is the clearance d.

In the method for generating the machining program for performing such an electrical discharge machining, first, the electrode path generation step for setting the path of the electrode is performed. Subsequently, a first auxiliary path of the electrode guide 8 is generated so that the electrode guide 8 moves apart from the surface 82 of the workpiece having the initial shape by the predetermined clearance d based on the path of the electrode. In the present embodiment, the first auxiliary path is generated so that a movement is made while the clearance d is maintained to be minimum.

Next, a judgement step for judging whether or not, when the electrode guide 8 moves in the first auxiliary path, the electrode guide 8 interferes with the workpiece 20 around the first auxiliary path is performed. Then, when judgement in which the electrode guide 8 interferes with the workpiece 20 is made, a second auxiliary path in which the electrode guide 8 is separated from the workpiece so that an interference with the workpiece 20 is avoided is generated. Then, the machining program is generated based on the path of the electrode and the second auxiliary path of the electrode guide.

Figure 11:
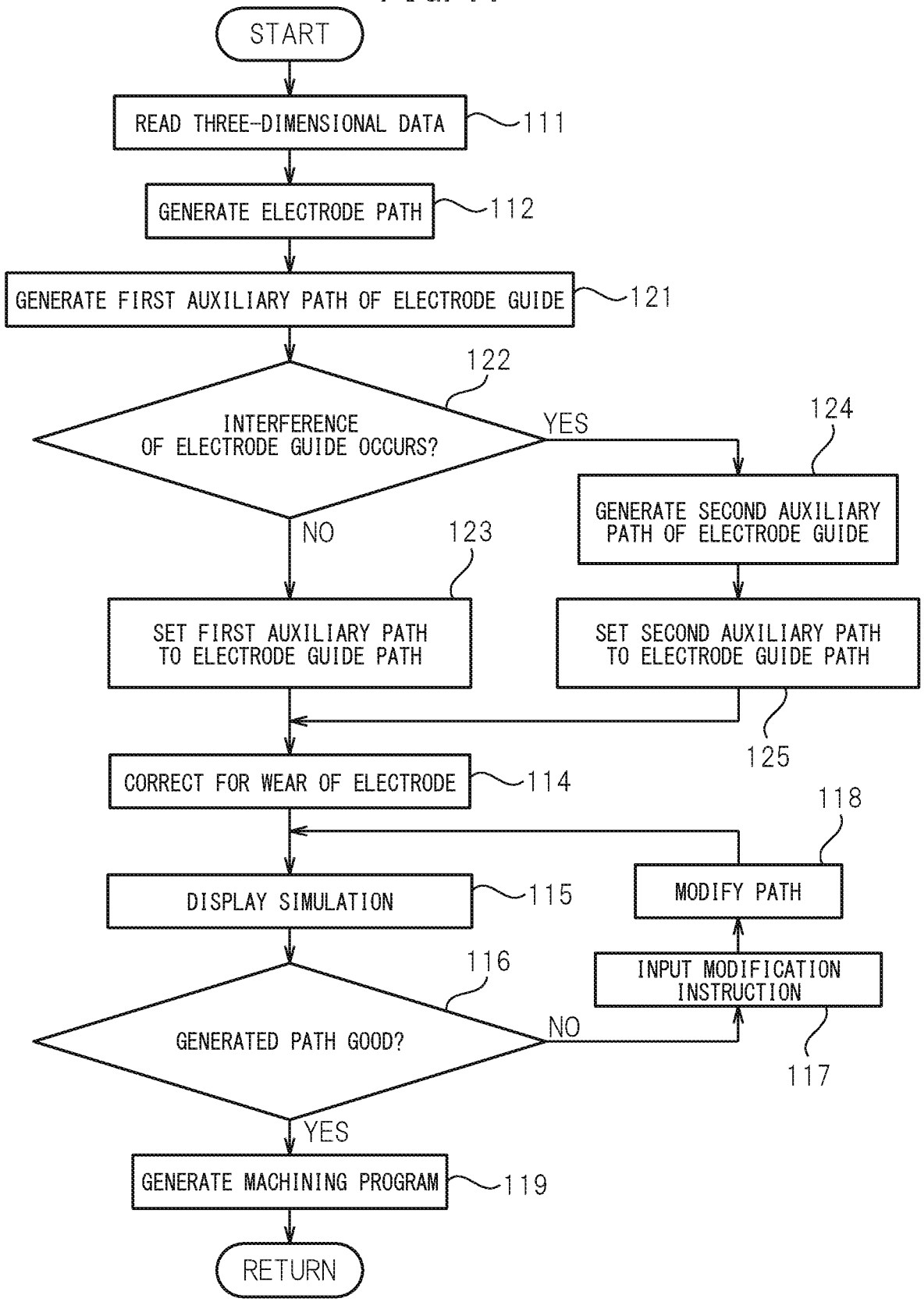
FIG. 11 is a flowchart of another method for generating the machining program according to the embodiment.

FIG. 11 shows a flowchart of another method for generating the machining program according to the present embodiment. Step 111 and step 112 are similar to the method for generating the machining program as illustrated in FIG. 6. After the path of the electrode is generated in step 112, the guide path generation step for generating the path of the electrode guide is performed. The path of the electrode guide can be generated by the guide path generation part 54 (see FIG. 1).

In step 121, the first auxiliary path of the electrode guide 8 is generated. The first auxiliary path can be generated based on the path of the electrode. As the first auxiliary path, for example, a path which makes the minimum clearance d relative to the surface 82 of the workpiece 20 to be maintained and is further parallel to the path of the electrode can be generated.

Next, in step 122, a judgement step for judging whether or not an interference of the electrode guide 8 occurs is performed. In the present embodiment, using a three-dimensional model such as the electrical discharge machine 30 and the workpiece 20, the judgement whether or not an interference with the workpiece 20 occurs if the electrode guide 8 is moved in the first auxiliary path is made. Note that as a target object which may cause an interference of the electrode guide 8 around the first auxiliary path, the workpiece 20 is not limitative, and any components such as a part of the electrical discharge machine 30, can be adopted.

In step 122, when the judgement in which an interference of the electrode guide 8 does not occur is made, the routine proceeds to step 123. In step 123, the first auxiliary path is set to the path of the electrode guide. In step 122, when the judgement in which an interference of the electrode guide 8 occurs is made, the routine proceeds step 124.

In step 124, the first auxiliary path is modified to generate the second auxiliary path. In the present embodiment, in a section in which an interference of the electrode guide 8 occurs, the electrode guide 8 is drawn out to such a position that the electrode guide 8 does not interfere with the workpiece 20. In the present embodiment, the first auxiliary path of the electrode guide 8 is moved in the W-axis direction. Then, the second auxiliary path in which an interference with the workpiece 20 does not occur is generated. Next, in step 125, the second auxiliary path is set to be the path of the electrode guide.

Step 114 to step 119 thereafter are similar to the method for generating the machining program as illustrated in FIG. 6.

In another method for generating the machining program according to the present embodiment, the judgement whether or not the electrode guide interferes with a target object such as the workpiece is made. Consequently, an interference of the electrode guide can be reliably avoided. In addition, a clearance between the surface of the workpiece having the initial shape and the electrode guide can be set to be short within a range of avoiding an interference with a target object in accordance with a momentary shape of a part to be machined of the workpiece, a deflection of the electrode is suppressed, and a machining speed and a machining accuracy can be improved.

The embodiment as described above has been described by illustrating examples in which the groove portion is formed as an example of machining the workpiece, but machining of the workpiece is not limited to this embodiment, and the present invention can apply to machining in which a hole greater than an outer diameter of the electrode is formed, machining in which a hole having a tapered cross section is formed, and the like.

The path generation apparatus according to the present embodiment is included in the CAM apparatus, however, the embodiment is not limited to this, and the path generation apparatus may be disposed in another device such as the electrical discharge machine.

In each method as described above, the order of the steps can be changed within a range in which functions and actions are not changed.

The embodiments as described above can be suitably combined. In each drawing as described above, the same or similar components are assigned the same reference signs. Note that the embodiments as described above are illustrative and are not to limit the invention. Moreover, the embodiments include modifications of the embodiments recited in the claims.

REFERENCE SIGNS LIST 8 electrode guide
9 grasping arm
10 electrode
12 inclination rotating table device
20 workpiece
30 electrical discharge machine
31 numerical control device
32 each axis drive part
50 CAM apparatus
51 shape data reading part
52 path generation part
53 electrode path generation part
54 guide path generation part
55 electrode wear correction part
56 input part
58 display part
59 program generation part
80, 83 groove portion

The invention claimed is:

1. A method for generating a machining program of an electrical discharge machine which comprises an electrode guide supporting an electrode having a rod shape and electrically discharging at an end portion of the electrode protruding from the electrode guide, the electrode guide and the electrode being configured to move in X-, Y- and Z-axes directions relative to a workpiece, the method comprising:
obtaining an initial shape of a workpiece before machining and a target shape of the workpiece;
generating a path of the electrode, based on the target shape of the workpiece, in which the electrode moves in the X-, Y- and Z-axes directions relatively to the workpiece along the target shape of the workpiece;
generating a path of the electrode guide, based on the initial shape of the workpiece and three-dimensional data of the electrode guide, the path of the electrode guide allowing the electrode guide to move in the X-, and Y-axes directions, and also allowing the electrode guide to move in the Z-axis direction independently from a Z-axis movement of the electrode in the path of the electrode so that a position of the end portion of the electrode in the Z-axis direction relative to the electrode guide changes, along a surface of the initial shape of the workpiece without interference between the electrode guide and the workpiece; and generating a machining program in accordance with the generated path of the electrode and the generated path of the electrode guide.

2. The method for generating the machining program according to claim 1, wherein
the generating a path of the electrode guide includes:
a step of generating a first auxiliary path of the electrode guide so that the electrode guide separates by a predetermined clearance from a surface of the workpiece having the initial shape based on the path of the electrode;
a judgement step for judging whether or not the electrode guide interferes with a target object around the first auxiliary path when the electrode guide moves in the first auxiliary path; and
a step of generating a second auxiliary path of the electrode guide in which the electrode guide is separated from the target object until an interference with the target object is avoided when it is judged that the electrode guide interferes with the target object in the judgement step, and
the machining program is generated while setting the second auxiliary path as the path of the electrode guide.

3. The method for generating the machining program according to claim 1, wherein the generating of the electrode path includes correcting for a wear amount of the electrode which wears in accompany with an electrical discharge machining, and a path in which the electrode is moved relatively to the workpiece in a direction in which a tip end of the electrode advances toward the workpiece is generated.

4. The method for generating the machining program according to claim 1, wherein the generating of the electrode path includes a step of generating a path in which the electrode moves relatively to the workpiece while a state in which the electrode extends substantially vertical to a surface of the target shape of the workpiece is maintained.

5. The method for generating the machining program according to claim 1, further comprising displaying the generated path of the electrode and the generated path of the electrode guide in a display part and confirming the paths.

* * * * *